(12) United States Patent
Bellini, III et al.

(10) Patent No.: US 10,749,762 B2
(45) Date of Patent: Aug. 18, 2020

(54) SYSTEMS AND METHODS FOR MANAGING RESOURCE UTILIZATION IN CLOUD INFRASTRUCTURE

(71) Applicant: Connectwise, LLC, Tampa, FL (US)

(72) Inventors: Arnold Bellini, III, Tampa, FL (US); Jagannathan Shiva Shankar, Bangalore (IN); Topher Barrow, Tampa, FL (US); Craig M. Fulton, Clearwater, FL (US)

(73) Assignee: Connectwise, LLC, New York, NY (US)

( * ) Notice: Subject to any disclaimer, the term of this patent is extended or adjusted under 35 U.S.C. 154(b) by 175 days.

(21) Appl. No.: 15/941,921

(22) Filed: Mar. 30, 2018

(65) Prior Publication Data

US 2018/0287898 A1    Oct. 4, 2018

(30) Foreign Application Priority Data

Mar. 31, 2017 (IN) .............................. 201711011696

(51) Int. Cl.
*H04L 12/24* (2006.01)
*H04L 29/08* (2006.01)
*H04L 12/26* (2006.01)

(52) U.S. Cl.
CPC ...... *H04L 41/5096* (2013.01); *H04L 41/5009* (2013.01); *H04L 41/5074* (2013.01); *H04L 43/16* (2013.01); *H04L 67/10* (2013.01)

(58) Field of Classification Search
CPC .............. H04L 41/5096; H04L 41/5074; H04L 41/5009; H04L 67/10; H04L 43/16
See application file for complete search history.

(56) References Cited

U.S. PATENT DOCUMENTS 8,448,170 B2   5/2013   Wipfel et al.
2002/0147974 A1   10/2002   Wookey
(Continued)

OTHER PUBLICATIONS

Amanatullah Yanuarizki et al., "Toward cloud computing reference architecture: Cloud service management perspective." ICT for Smart Society (ICISS), 2013 International Conference on. IEEE, 2013, 5 pages.

(Continued)

*Primary Examiner* — Abdulkader M Alriyashi
(74) *Attorney, Agent, or Firm* — Foley & Lardner LLP

(57) ABSTRACT

The present disclosure relates to managing resource utilization in cloud service infrastructure. A device can monitor the cloud service. The cloud service can be configured with an automatic scaling function based on a threshold. The device can determine, based on the monitoring, that a utilization value of the cloud service during a time interval exceeds the threshold. The device can generate, using a policy based on the utilization value and the threshold, an instruction to disable the automatic scaling function of the cloud service by the one or more servers. The device can transmit the instruction to the one or more servers via a second cloud application programming interface. The device can generate, responsive to the policy, a service ticket data structure with an indication of the utilization value and the time interval. The device can provide the service ticket data structure to an electronic board.

20 Claims, 9 Drawing Sheets

(56) References Cited

U.S. PATENT DOCUMENTS

| | | | | |
|---|---|---|---|---|
| 2010/0223383 A1* | 9/2010 | Salevan | ............... | G06F 11/3442 |
| | | | | 709/226 |
| 2012/0254443 A1* | 10/2012 | Ueda | .................. | H04L 67/1008 |
| | | | | 709/226 |
| 2013/0055283 A1* | 2/2013 | Mopur | ................... | G06F 9/5083 |
| | | | | 718/104 |
| 2016/0323377 A1* | 11/2016 | Einkauf | .............. | H04L 67/1076 |
| 2018/0329758 A1* | 11/2018 | Zhu | ......................... | G06F 9/455 |

OTHER PUBLICATIONS

Binz et al., "TOSCA: Portable Automated Deployment and Management of Cloud Applications," Advanced Web Services, Springer New York, 2014, pp. 527-549.

Ferrer et al. "OPTIMIS: A holistic approach to cloud service provisioning," Future Generation Systems, vol. 28, 2012, pp. 66-77.

Machida et al., "Candy: Component-based Availability Modeling Framework for Cloud Service Management Using SysML," Reliable Distributed Systems (SRDS), 2011 30th IEEE Symposium on IEEE, 2011, 10 pages.

Sellami et al., "PaaS-independent Provisioning and Management of Applications in the Cloud," Cloud Computing (CLOUD), 2013 IEEE Sixth International Conference on. IEEE, 2013, pp. 693-700.

* cited by examiner

SYSTEMS AND METHODS FOR MANAGING RESOURCE UTILIZATION IN CLOUD INFRASTRUCTURE

CROSS-REFERENCES TO RELATED APPLICATIONS

This application claims the benefit of priority under 35 U.S.C. § 119 to Indian Patent Application No. 201711011696, filed Mar. 31, 2017, and titled "SYSTEMS AND METHODS FOR MANAGING RESOURCE UTILIZATION IN CLOUD INFRASTRUCTURE", which is hereby incorporated by reference herein in its entirety.

FIELD OF THE DISCLOSURE

The present disclosure generally relates to reducing the resource utilization of cloud services by determining to enable or disable configuration updates. More specifically, the present disclosure relates to monitoring the computing resources utilized by a cloud service, and disabling the configuration update based on a policy.

BACKGROUND OF THE DISCLOSURE

A cloud service can include a server providing a service or a resource over a network to a client device. Several different client devices can be configured to access or utilize, via the network, one or more services or resources provided by the cloud service. However, as increasing numbers of client devices access various types of services or resources provided by the cloud service, and the cloud service automatically updates its configuration to accommodate such increased access, there may be excessive memory, bandwidth, and processor utilization.

SUMMARY OF THE DISCLOSURE

At least one aspect is directed to a method of managing resource utilization in cloud service infrastructure. The method can include monitoring, by a device intermediary to a client device and one or more servers that provide cloud services, via a first cloud application programming interface, a cloud service provided by the one or more servers. The cloud service can be configured with an automatic scaling function based on a threshold. The method can include the device determining, based on the monitoring, that a utilization value of the cloud service during a time interval exceeds the threshold. The method can include the device generating, using a policy based on the utilization value and the threshold, an instruction to disable the automatic scaling function of the cloud service by the one or more servers. The method can include the device transmitting the instruction to the one or more servers via a second cloud application programming interface. The method can include the device generating, responsive to the policy, a service ticket data structure with an indication of the utilization value and the time interval. The method can include the device providing the service ticket data structure to an electronic board to cause the electronic board to process the service ticket data structure and assign a service ticket to a support agent.

The device can transmit, via the first cloud application programming interface, a request for utilization information of the cloud service and threshold information for the cloud service. The device can receive, responsive to the request, the utilization value and the threshold. The utilization value can correspond to at least one of bandwidth utilization, memory utilization, storage utilization, processor utilization, or input/output utilization. The threshold can include a dynamic threshold established by the provider of the cloud service. The threshold can include a dynamic threshold established based on utilization information from a plurality of cloud services.

The device can determine a historical utilization of the cloud service by the client device. The device can predict, based on the historical utilization, an estimated utilization value for the time interval. The device can determine, based on the policy and a comparison of the estimated utilization value and the utilization value, to generate the instruction to disable the automatic scaling function of the cloud service.

The device can determine, via a validation component of the device, that the one or more servers providing the cloud service are configured to automatically modify a configuration of the cloud service to increase capacity based on the utilization value. The device can assemble, via a packaging component of the device, a script to disable the automatic scaling function for the cloud service. The device can assemble the script responsive to determining to disable the automatic scaling function of the cloud service.

The device can disable the automatic scaling function for the cloud service using an application programming interface of the cloud service. The device can disable the automatic scaling function for the cloud service using a script. The device can perform one or more components of the automatic scaling function of the cloud service using an application programming interface of the cloud service. The device can perform one or more components of the automatic scaling function of the cloud service using a script. The one or more components of the automatic scaling function performed by the device can correspond to at least one of changing the maximum bandwidth allocated to the cloud service, changing the maximum memory allocated to the cloud service, changing the maximum storage allocated to the cloud service, changing he maximum processor utilization allocated to the cloud service, or changing the maximum input/output utilization allocated to the cloud service. The device can provide the ability to disable the automatic scaling function for the cloud service based on user input. The device can provide the ability to modify the one or more components of the automatic scaling function based on user input.

The device can determine that a second utilization value of the cloud service during a second time interval exceeds the threshold. The device can generate, based on the policy, an instruction to enable the automatic scaling function of the cloud service for the second time interval.

The device can determine that a second utilization value of the cloud service during a second time interval exceeds the threshold. The device can determine a historical utilization of the cloud service by the client device. The device can predict, based on the historical utilization, an estimated utilization value for the second time interval. The device can determine, based on the policy and a comparison of the estimated utilization value and the second utilization value, to generate an instruction to enable the automatic scaling function of the cloud service. The device can provide the ability to enable the automatic scaling function of the cloud service based on user input.

The device can monitor a second cloud service provided by a second one or more servers different from the first one or more servers. The second cloud service can be configured with automatic scaling function based on a second threshold. The device can determine, based on the second threshold and a second utilization value of the second cloud service during a second time interval, to disable the automatic scaling function of the second cloud service. The device can transmit an instruction to the second one or more servers via a third cloud application programming interface to disable the automatic scaling function of the second cloud service. The cloud service can be provided by a first cloud service provider, and the second cloud service can be provided by a second cloud service provider different from the first cloud service provider.

At least one aspect is directed to a system to manage resource utilization in cloud service infrastructure. The system can include a device intermediary to a client device and one or more servers that provide cloud services. The system can include a monitoring component, a validation component, and a packaging component executed by the device. The device can monitor, via a first cloud application programming interface, a cloud service provided by the one or more servers, the cloud service configured with an automatic scaling function based on a threshold. The device can determine, based on the monitor, that a utilization value of the cloud service during a time interval exceeds the threshold. The device can generate, using a policy based on the utilization value and the threshold, an instruction to disable the automatic scaling function of the cloud service by the one or more servers. The device can transmit the instruction to the one or more servers via a second cloud application programming interface. The device can generate, responsive to the policy, a service ticket data structure with an indication of the utilization value and the time interval. The device can provide the service ticket data structure to an electronic board to cause the electronic board to process the service ticket data structure and assign a service ticket to a support agent.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION OF THE DISCLOSURE

Figure 1:
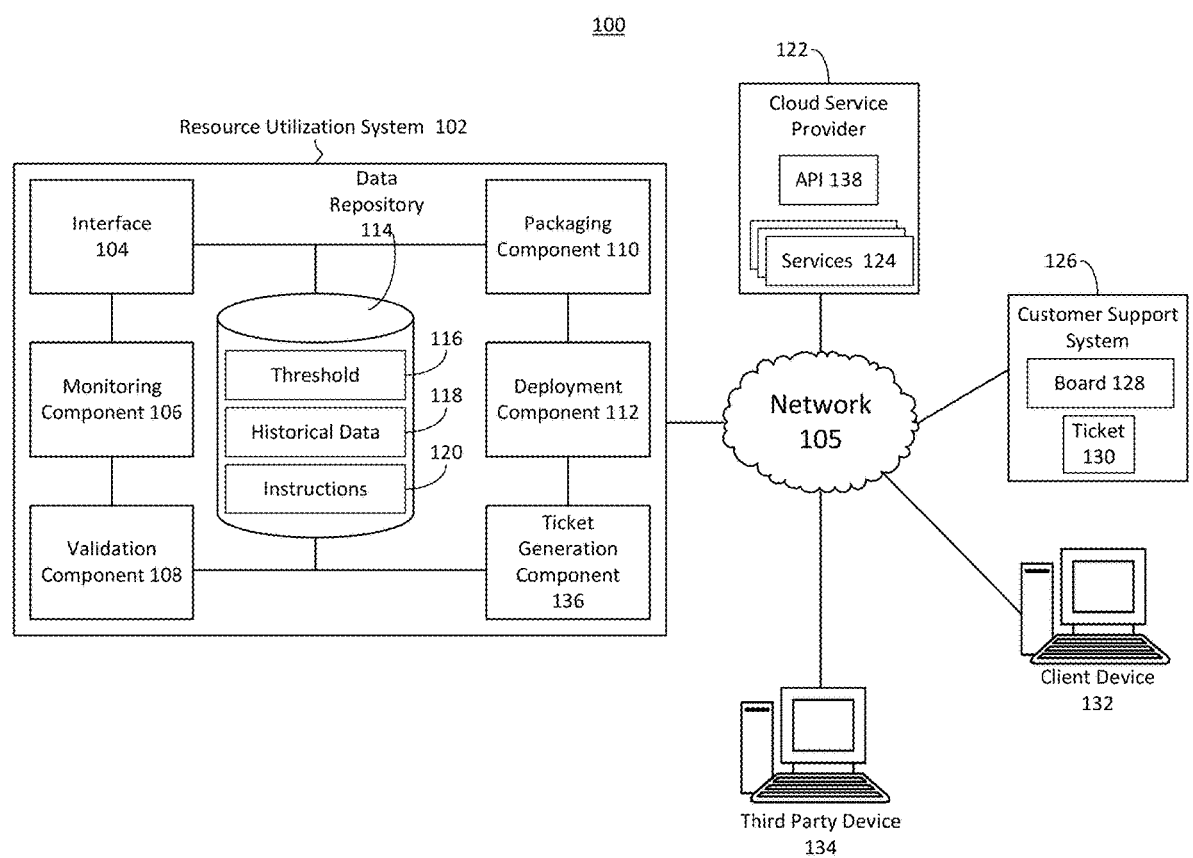
FIG. 1 is an illustrative block diagram of an example embodiment of a system to manage resource utilization in cloud service infrastructure.

A cloud service can provide a service or resource over a network, such as the Internet. Cloud services can include Software as a Service ("SaaS"), Platform as a Service ("PaaS"), or Infrastructure as a Service ("IaaS"). SaaS can include a software distribution model in which an application can be hosted by a vendor or service provider and made available to customers over the network. PaaS can include the delivery of an operating system and associated services of the network without downloading or installing the operating system. IaaS can include outsourcing equipment used to support operations, including storage, hardware, servers and network components, which can be access over the network.

Cloud services can provide useful facilities for client devices (or end users) by scaling the resources to match or correspond to the usage of the end user client devices. This can distribute the usage of fixed computing resources more evenly. For example, a cloud based email service can improve the capability of the service by increasing the storage space allocated to an end user to accommodate a temporary increase in incoming email with large attachments. In another example embodiment, a cloud based web service can improve the response of a web site by increasing the network bandwidth allocated to the site during a time of peak utilization, such as in response to a sale on an e-commerce site.

Cloud services can provide services in a multi-tenanted fashion, where a single machine can provide the same service to multiple groups of end users in such a way that each group is unaware of the others and has exclusive access to one complete instance of the cloud service. This multi-tenancy can be implemented natively, where the cloud service itself can be designed to present multiple isolated instances of the service. Multi-tenancy can be implemented using multiple virtual machines, where each virtual machine can run a separate instance of the cloud service. In either implementation, the multiple instances of the cloud service used by multiple tenants can share resources of the underlying physical machine while still maintaining the independence of the instances. This can be implemented by having separate configuration and state information for each instance of the cloud service. For example, each instance of a cloud based email service can have a different set of mailboxes (state information) and a different email domain (configuration information). It can also be beneficial to have a global set of configuration and state information that can control the operation of the cloud service, independent of any particular instance. For example, a cloud based email service can have a log file for system level errors (state information) and a setting for the target maximum memory usage (configuration information).

Multi-tenancy can be advantageous for utilizing the resources of a machine more efficiently, since the peak usages of resources can be different for different tenants. For example, two tenants using a cloud based email service can both have employees that check their email when they arrive in the morning, creating a peak load for the first hour of the work day, but the two tenants can have employees that are mostly in two different time zones, so the machine resources can be utilized for first one tenant, then the other. In another example embodiment, two tenants can be using a cloud based customer support system, but one tenant can be a travel agent with peak customer interaction during the summer vacation months, and another tenant can be a tax accountant with peak customer interaction during March and April, leading up to the Federal Tax filing deadline. In both cases, the staggering of peak resource usage can be helpful in utilizing the machine resources efficiently with the same resources handling both peak requirements instead of a separate set of resources for each peak.

In order to take advantage of the multi-tenancy properly, it can be necessary to adjust the configuration of the cloud service. To continue the email cloud service example embodiment previously, it can be necessary to set up a schedule that increases the total number of incoming email connections allowed for each tenant during the morning hour for that tenant's time zone. The configuration can take the form a resource allocation; to continue the customer support cloud service example embodiment described previously, it can be necessary to increase the overall maximum number of connections for both tenants, even though both tenants are not likely to use the entire allocation of the connection resource at the same time.

The state information and resource utilization that characterize a cloud service can be measured with improved accuracy compared to those of a service running on a corresponding physical machine. Similarly, the execution environment of a cloud service can be controlled more precisely that that of a service running on a corresponding physical machine. This can apply in both the case where a multi-tenanted cloud service is run natively on a machine, or in the case where virtual machines are used to manage multiple instances of a cloud service. In one example embodiment, in a cloud service that is multi-tenanted using multiple virtual machines, it can be possible to use an application programming interface (API) to the hypervisor to get a direct measurement of the network bandwidth utilization of each virtual machine, and therefore each tenant, separately, whereas the network driver on a physical machine may not be able to report per-process utilization, and may therefore not be able to provide network utilization for multiple tenants. On the control side, the hypervisor can provide an API to control CPU throttling of individual virtual machines, which can enable equitable resource sharing based on allocation, where in a physical machine, the operating system scheduler may not provide such fine grained control on a per-process level. This information and control can be used to improve the performance of the cloud service by applying configuration updates and resource allocations, based on the improved measurements, and utilizing the improved control features to apply those updates and resource allocations. The improved measurements can be used to more accurately predict the operation of the cloud service and can correspondingly improve the selection of the configuration updates and resource allocations. To continue the email cloud service example embodiment described previously, a review of the CPU utilization of the tenants can reveal peak CPU usage for two tenants at two different morning hours, resulting from the two tenants being in two different time zones, and it can be possible to allocate a higher CPU limit to each tenant during their peak operation time, providing a more efficient overall utilization of the machine CPU resource.

The improvement to the cloud service can rely on real-time access to information that is not available to the separate tenants, and may instead only be available to the cloud service itself. For example, the two tenants in the previous example can be legally obligated to prevent disclosure of their operations to each other, and may therefore not be able to coordinate the staggered increased CPU limit, but the neutral third party running the cloud service may be able to make this determination without reference to the details of the operations of either tenant.

In some cases, the software can have the ability to store data in a central "cloud storage" data repository. This facility can also be managed online. Payment, which can also be an ongoing subscription fee, can be provided through an e-commerce transaction. The cost can be usage-based, so that the amount is a function of how much storage is used.

The computing hardware to run the software can also be provided in a central facility, which can also be managed online, and can also be provided for payment that is an ongoing subscription fee. The two ways of providing this are as a standard machine and operating system configuration, called "infrastructure as a service" (IaaS), or as a higher level API interface to an underlying compute engine, called "platform as a service" (PaaS).

When all three of the software, storage, and hardware are provided online, usually for a subscription fee, the combination is a "cloud service". Cloud services have become increasingly popular as a way to manage information technology (IT) costs in a predictable way.

Many companies outsource their IT services to outside IT service providers. This can be more economical for the companies because they may not have enough ongoing need to support a full time IT support technician. The IT service provider can share the time of one technician across multiple companies and efficiently provide service to smaller companies in this way. In addition, with economies of scale, an IT service provider can afford to hire technicians with expertise in specific areas and be more efficient in providing service in those areas. IT service providers often use software tools to help manage their own support business, and the tools can help to automate the monitoring, service, and configuration of their customers.

The shift toward cloud services has not eliminated the need for outsourced IT support. Cloud service software has all the same requirements for installation, setup, configuration, monitoring, support, and maintenance as its non-cloud-service predecessor, often called "shrink-wrap software". In addition, the maintenance of cloud service software includes managing the billing of the subscription of the different components that are involved. This can be complicated by the fact that different vendors of the different components can have different billing requirements and cycles. In addition, the vendor can provide discounts to the IT service provider in exchange for billing the service provider directly, and allowing the service provider to resell the cloud service to the end customer.

Since the cloud service components are available online, the end customers would like to have the freedom to shop online for software components, services, and configurations, and purchase them for use. They would like to be able to do this quickly and easily, without having to wait for the IT service provider to be involved in the installation, setup, and configuration of the new software components. The IT service provider would also like to provide this convenience to the end customers, but also does not want the customers to set up new components incorrectly, causing service calls, or even worse, set up incompatible new components that interfere with the operation of existing components, causing even bigger problems if a critical existing component fails. Ideally, the IT service provider would like end customers to have the ability to set up new components, services, and configurations, which provides both more customer satisfaction and more revenue for the service provider, but do so in a controlled way that avoids problems and support calls, and also do so in an automated way that does not involve action on the part of the service provider.

Systems and methods of the present disclosure can provide this capability using one or more components, including, for example, a validation component, a packaging component, a deployment component, and a deployment or management component. In addition, the disclosure provides scripting support, which is used to implement all three of the major functions. The disclosure can manage the resource utilization of the cloud service and, in some cases, reduce the resource consumption by preventing or blocking certain automatic configuration updates.

The implementation using a high-level scripting language designed for the purpose of implementing these functions simplifies the addition of new components, services, and configurations to the cloud management system that is used by the IT service provider. These can be done by the company supplying the cloud management system, or by the IT service provider if a specific function is needed immediately and the IT service provider has the capability to create and test the function.

The validation component can check to see if the current configuration of the end customer will support the addition of the newly requested component, service, or configuration, and if not, what kinds of changes would be required to support the new request. For example, the new request can require other components that are not present, or version upgrades to existing components that are present, or configuration changes to existing components. The new request can come from a new third-party vendor, and can therefore require a new account to be created. The new request can require a billing change with an existing vendor, such as adding more users to an existing account. The new request can require a capacity increase in the services from an existing vendor, such as adding more storage capacity or more computing capability.

The validation component can use information about the current configuration of the cloud services of the customer. If the customer has been managed by the same IT service provider from the beginning, then this information can be available in a configuration database that is maintained by the provider, but service providers often "inherit" existing configurations, or a customer may find a way to modify a configuration without using the service provider tools, so it can be desirable to determine the current configuration from the existing cloud service software itself. This can be done using APIs provided by the cloud service software, or by using an agent that is part of the cloud management system running on the cloud platform, or by a combination of the two. This function to determine the current configuration can be controlled by the scripting language mentioned previously, in order to make it easier to add the ability to detect new kinds of configurations.

The packaging component can use the results from the validation function to assemble the software components needed to make all the required changes to the cloud service platform of the end customer in order to add the requested component, service, or configuration. This can require including scripts, software components, licensing keys, and account information in the package. For example, if an existing component needs to be upgraded to a new version, and the new component is from a new vendor, the packaging function can prepare a package that includes a script to upgrade the existing component, the software with the new version of the existing component, the software for the new component, the license key for the new component, the account information at the new vendor, a script to install the new component, and a script to configure the new component. The packaging function can be controlled by the scripting language mentioned previously, in order to make it easier to add the ability to manage the installation, setup, and configuration of new kinds of components, services, and configurations.

The deployment component can apply the package to the cloud service platform in order to actually provide the requested component, service, or configuration. The deployment component can run scripts, download software, apply licenses, access accounts, and sequence operations serially or in parallel as required. These operations can be done using APIs provided by the cloud service software, or by using an agent that is part of the cloud management system running on the cloud platform, or by a combination of the two. The deployment component can be controlled by the scripting language mentioned previously, in order to make it easier to add the ability to perform new kinds of operations. The deployment component can also provide notifications and status updates on its progress to the end customer, the service provider, or both.

An interface can include a management component or management function. The interface can provide a user interface that provides a convenient way to access the cloud service management capabilities. The interface can be different for end customers and the service provider. The end customers can also have different capabilities depending on the user account being used to access the interface. For example, administrators at a customer can have the ability to add, remove, or modify components, services, and configurations that affect other users at the customer, but individual users may only be able to make configuration changes for their own account on the cloud services that have been set up for them by an administrator.

The end customer interface can show the cloud service components that have been selected by the service provider, and allow searching and browsing by category, keywords, ratings, popularity, price, and other parameters. The interface can allow rating and commenting on the components. The validation component can be used to show which components can be used by the customer, and which ones are not available. The interface can provide a mechanism for adding a new component for the customer, changing a configuration of an existing component, or removing an existing component, or for selecting a subset of the users at the customer and adding, removing, or modifying the component for that subset. The users at a customer can be organized into groups, and can be accessed using searching and browsing by user name, group, keywords, and other parameters. The interface can also provide access to billing and reporting functions to allow auditing, report generation, payments, and so on.

The service provider interface can provide the same services, but can provide the capability to apply the operations to multiple customers, or groups of users in multiple customers. The customers can also be organized into groups, and can be accessed using searching and browsing by customer name, group, keywords, and other parameters. The interface can also provide functions to add, remove, and update cloud service components, services, and configurations, which can involve adding, removing, and modifying relationships, accounts, and authentication with third party vendors. The interface can also provide access to billing and reporting functions to allow auditing, report generation, distribution of billing to customers, payment collection from customers, payments to vendors, and so on.

In a representative example, an IT service provider wants to make a new spam filtering service from a new third party vendor available as an add-on to an existing email service, and as a reseller for the spam filtering vendor. The service provider uses the management interface to create a new account at the vendor, set up a volume discount license pack with the vendor, download the software from the vendor, and download the set of support scripts from the supplier of the cloud service management system. The service provider then adds the offering to the list of cloud services available, and uses the interface to send an email announcement to the administrators at all of the customers.

One of the administrators has been getting complaints about the increase in spam and reads the email with interest. The administrator accesses the management interface and looks at the new feature. The validation function determines that this customer will need to upgrade to a new version of the email service in order to use the feature, then sees that the upgrade will require a new version of the email database, and sees that the new database will require some changes to the configuration of the underlying platform. The validation function reports in the interface that the new feature is available but will require 15 minutes of downtime of the email service in order to install. The administrator uses the interface to order the new feature, and schedule the installation at 9 PM that evening.

Using the result of the validation function, the packaging function assembles the scripts required to modify the platform configuration, install the new email database, backup the email data, transfer the email data from the old database to the new database, remove the old database, install the new feature, and configure the new feature. It also interacts with the third party vendor, using the account information to create the licenses required for all the existing users, and provide those licenses to the script for configuring the new feature. It sets up the sequence for the upgrade, using a schedule that starts at 9 PM. The packaging function assembles these components into a package.

The deployment component notes the downtime requirement and schedule in the package and sends a notification to the users of the email service regarding the expected downtime. At 9 PM, it manages running the scripts to apply the upgrade, logging any exception conditions and errors that arise. When the upgrade is complete, it sends a notification to the administrator and to the service provider, including the logs for diagnosis of any exception conditions. The relatively complex upgrade desired by the end customer has been implemented at customer request without intervention by the service provider.

In another representative example, an IT service provider is managing an email cloud service for a customer, and the employees at the customer site are the target of a coordinated marketing campaign that delivers a large volume of spam email to those employees through the email cloud service. The resulting surge of incoming email causes the processor and disk space utilization of the cloud machine to increase rapidly. In this example, an automatic scaling process on the cloud service initiates the request to increase the processor and disk resources, rather than a manual request through the management interface, but the process is similar.

The IT service provider knows that this customer is cost sensitive, and wants to pre-approve any changes to the cloud service that will incur a recurring expense, and as a result, has set up the cloud management service to assist with that process. The validation function determines that the automated scaling process is about to modify the configuration of the cloud service. Using the result of the validation function, the packaging function assembles a script to disable the automatic scaling function, at least temporarily, and to enter a ticket into a support system for review.

The deployment component applies the package, which disables the automatic scaling function and enters the ticket. The IT service provider sees the ticket on the support dashboard, and reviews the nature of the email triggering the automatic scaling operation. Upon seeing that the email is a one-time transient surge that is likely to be filtered or discarded, the IT service provider declines the automatic scaling operation. After a brief slowdown, the email service returns to its normal service level with no additional need for resources. In this example, the script created by the package can have additional options, such as re-enabling the automatic scaling operation after a certain delay, or providing the IT service provider with an option to re-enable the automatic scaling operation.

In an illustrative example, an email cloud service can exceed the threshold of connections. The email cloud service can be configured with an automatic scaling function to automatically increase the quota for email connections by a fixed amount (for example, 20%), and limiting the number of such automatic increases to a fixed rate (for example, once per month). However, the device of the present disclosure can monitor the amount of email connection and determine that the utilization of the email cloud service exceeds the threshold or can exceed the threshold. The device can determine that the email cloud service is exceeding the threshold due to unwanted emails, spam, or fraudulent communications, and block the automatic scaling function of the email cloud service. The device can then generate a support ticket indicating the increased utilization, and transmit it to an electronic dashboard that can assign the ticket to a support agent to resolve the issue. For example, the support agent can transmit an IP filter to block emails from certain IP addresses in order to reduce the resource utilization of the email cloud service, thereby avoiding the need to increase a capacity (e.g., memory, processor, etc.) of the email cloud service.

Referring now to FIG. 1, an illustrative block diagram of an example embodiment of a system to manage resource utilization in cloud service infrastructure. In brief overview, the system 100 can include a resource utilization system ("RUS") 102. The system 100 can include, access or interact with one or more of a cloud service provider device 122, customer support system 126, client device 132, and third party device 134. The system 100 can include one or more component or function of system 200, system 400 or the system or components depicted in FIGS. 6A-6D.

Figure 6A:
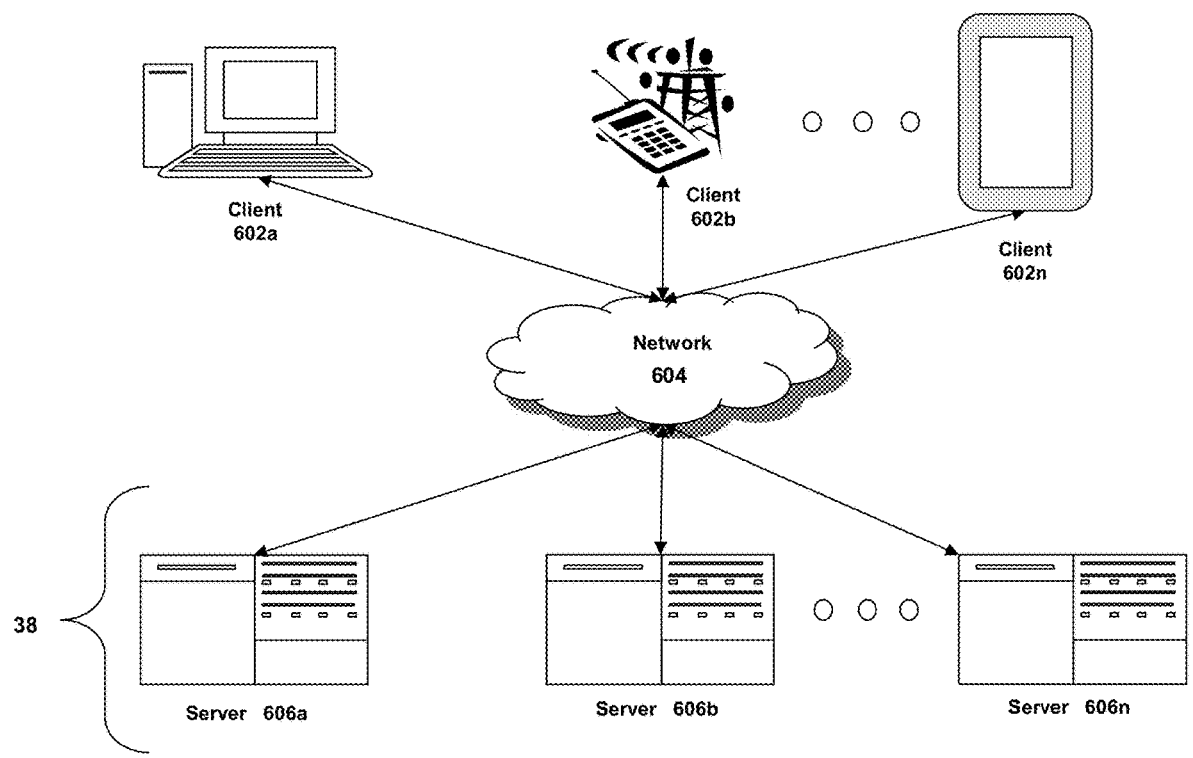
FIG. 6A is a block diagram depicting an embodiment of a network environment comprising client device in communication with server device.

The cloud service device 122 (e.g., executed by cloud 608 depicted in FIG. 6B) can provide services 124 to an end user of a client device 132 (e.g., a client device 602a-602n depicted in FIGS. 6A-6B) who can access it using a network (e.g., network 105 or network 604 depicted in FIG. 6A). The cloud service 122 can run on a server (e.g., server 606a-606n depicted in FIG. 6A) that is accessible to the end user 132. The cloud service 122 can contain state information that can store control parameters that control the operation of the cloud service 122 and can also store data that indicates the results of the operation of the cloud service 122.

The cloud service 122 can provide one or more resources or services 124 over a network, such as the Internet. Cloud services can include Software as a Service ("SaaS"), Platform as a Service ("Paas"), or Infrastructure as a Service ("IaaS"). SaaS can include a software distribution model in which an application can be hosted by a vendor or service provider and made available to customers over the network. PaaS can include the delivery of an operating system and associated services of the network without downloading or installing the operating system. IaaS can include outsourcing equipment used to support operations, including storage, hardware, servers and network components, which can be access over the network.

The cloud service 122 can be configured to scale the resources to match or correspond to the usage of the end user client devices. The cloud service 122, or individual services 124, can be configured to automatically scale based on various conditions. Scaling a service or resource can distribute the usage of fixed computing resources more evenly. For example, a cloud based email service 124 can improve the capability of the service by increasing the storage space allocated to an end user to accommodate a temporary increase in incoming email with large attachments. In another example embodiment, a cloud based web service 124 can improve the response of a web site by increasing the network bandwidth allocated to the site during a time of peak utilization, such as in response to a sale on an e-commerce site.

A cloud service provider 122 can provide services 124 in a multi-tenanted fashion, where a single machine can provide the same service to multiple groups of end users in such a way that each group is unaware of the others and has exclusive access to one complete instance of the cloud service. This multi-tenancy can be implemented natively, where the cloud service itself can be designed to present multiple isolated instances of the service. Multi-tenancy can be implemented using multiple virtual machines (e.g., virtual machines 402 depicted in FIG. 4), where each virtual machine 402 can run a separate instance of the cloud service 404. In either implementation, the multiple instances of the cloud service used by multiple tenants can share resources of the underlying physical machine while still maintaining the independence of the instances. This can be implemented by having separate configuration and state information for each instance of the cloud service. For example, each instance of a cloud based email service can have a different set of mailboxes (state information) and a different email domain (configuration information). It can also be beneficial to have a global set of configuration and state information that can control the operation of the cloud service, independent of any particular instance. For example, a cloud based email service can have a log file for system level errors (state information) and a setting for the target maximum memory usage (configuration information).

The system 100 can include, access or interact with a customer support system 126. The customer support system 126 can include or be referred to as a ticketing system. The customer support system 126 can receive ticket data and generate tickets 130. The customer support system 126 can process ticket data to prioritize tickets 130 and assign tickets 130 to support agents (e.g., support agents 202 depicted in FIG. 2). In some cases, the customer support system 126 can automatically prioritize and assign tickets to support agents (e.g., support agents 202). The customer support system 126 can, in some cases, automatically respond to tickets or resolve tickets. For example, a customer support system 126 can include or be configured with one or more packages or script that the customer support system 126 can provide to a client device 132 or other third party device 134 in response to a ticket 130. Resolving the ticket, either automatically or via forwarding the ticket to a support agent 202, can result in improving the performance of the cloud service 124 or fixing a technical problem of the cloud service 124 or component associated with, or interacting with, the cloud service 124. The customer support system 126 can generate a notification based on a new ticket 130 or an existing ticket 130, and the notification can be sent to the client device 132, third party device 134, or RUS 102. The support agent 202 can refer to a customer support representative, a support technician, a device of a customer support representative or technician, or an agent executed by a processor of a device.

The client device 132 can be referred to as an end user device. The client device 132 can receive services or support from the customer support system 126. The client device 132 can be a customer of the cloud service provider 122. The client device 132 can be a customer of the RUS 102. The client device 132 can access or utilize services 124 provided by the cloud service provider device 122 via network 105.

The third party device 134 can include or refer to third parties that may or may not be affiliated with client device 132. In some cases, third party devices 134 can refer to a third party that may send an email to a client device 132. The email can be received by the email service 124 provided by cloud service provider 122 on behalf of the client device 132.

The system 100 can include a resource utilization system 102. The RUS 102 can include a data processing system. The RUS 102 can communicate, interface, or otherwise interact with one or more of the cloud service provider 122, customer support system 126, client device 132 or third party device 134 via network 105. In some cases, the RUS 102 may not interact with third party device 134. The network 105 can include computer networks such as the Internet, local, wide, metro, or other area networks, intranets, satellite networks, and other communication networks such as voice or data mobile telephone networks. The network can include or refer to network 604 depicted in FIG. 6A.

The RUS 102 can include, interface with or otherwise communication with at least one interface 104, at least one monitoring component 106, at least validation component 108, at least one packaging component 110, at least one deployment component 112, at least one ticket generation component 136 and at least one data repository 114. The data repository 114 can include one or more data structure, data bases, or data files, such as a threshold data structure 116, historical data data structure 118, and an instructions data file 120.

The interface 104, monitoring component 106, validation component 108, packaging component 110, deployment component 112, and ticket generation component 136 can each include at least one processing unit or other logic device such as programmable logic array engine, or module configured to communicate with the database repository or database 114. The interface 104, monitoring component 106, validation component 108, packaging component 110, deployment component 112, and ticket generation component 136 and data repository 114 can be separate components, a single component, or part of the RUS 102. The system 100 and its components, such as a RUS 102, can include hardware elements, such as one or more processors, logic devices, or circuits.

The RUS 102 includes an interface 104. The interface 104 can include any type of interface configured to facilitate communication between one or more component, system or device of system 100. The interface 104 can be configured to facilitate communication or interaction between components or elements of the resource utilization system 102. The interface 104 can provide a graphical user interface or other user interface to facilitate user interaction with the RUS 102.

The interface 104 can include, communicate with or execute one or more application programming interfaces ("APIs"). The APIs can be configured to interact or interface with a cloud service provider device 122, cloud service 124, customer support system 126, or client device 132. The interface 104 can include or utilize one or more cloud application programming interfaces. The interface can include or be based on, for example, a cloud API, Open Cloud Computing Interface ("OCCI"), or representation state transfer ("REST"). Responses and requests can be received or transmitted via the interface 104 using one or more protocol or language, such as, e.g., XML, HTML, JSON, HTTP, or SSL. The interface 104 can communicate with or API 138 of the cloud service provider 122. The interface 104 can communicate with API 138 to modify a configuration of one or more cloud services 124. For example, the cloud service provider device 122 can include or execute API 138 that is configured to allow the RUS 102 to interact with one or more cloud services 124. The API 138 can include or be based on, for example, a cloud API, Open Cloud Computing Interface ("OCCI"), or representation state transfer ("REST"). Responses and requests can be received or transmitted via the interface 104 using one or more protocol or language, such as, e.g., XML, HTML, JSON, HTTP, or SSL.

The RUS 102 can be intermediary to the client device 132 and one or more servers (e.g., cloud service provider device 122) that provide the cloud services 124. For example, the RUS 102 can interact directly with the cloud service provider device 122, and the client device 132 can interact with the RUS 102. The RUS 102 can be intermediary in the sense that the RUS 102 does not have to go through the client device 132 in order to interact with the cloud service provider device 122. In some cases, the client device 132 can interact with the cloud service provider device 122 via the RUS 102.

The RUS 102 can include a monitoring component 106. The monitoring component 106 can monitor, via a cloud application programming interface, a cloud service 124 provided by the one or more servers of cloud service provider 122. The monitoring component 106 can identify state information and resource utilization of the cloud service 124. The cloud service 124 can be configured with an automatic scaling function based on a threshold. For example, the automatic scaling function can be to automatically increase a bandwidth allocation, memory allocation, disk capacity, processor capacity, storage capacity, or other resource used by the cloud service 124.

The monitoring component 106 can transmit a request to the cloud service provider device 122 using the cloud API 104. The monitoring component 106 can transmit a request for utilization information for the cloud service 124. The request can include, for example, an indication or identification of the cloud service 124, client device 132, or customer account of the client device 132. The request can include authentication information or other credentials associated with the customer account (e.g., an account of the client device 132). The RUS 102 can store account identifiers, account credentials, or other account authorization information in data repository 114. The request can include an identification of the cloud service 124 for which utilization information is requested. The request can include an indication of a time interval for which the utilization information is requested. For example, the time interval can be a start time stamp and an end time stamp or a start time stamp and a duration. The request can include an indication of the type of utilization information being requested (e.g., bandwidth utilization, a memory utilization, a processor utilization, or input/output utilization). For example, the request can include the following data fields: {customer account identifier, cloud service identifier, utilization information requested, time stamp}.

In some cases, the RUS 102 can establish a secure communication session with the cloud service provider 122 using interface 104 and the credentials, tokens or identifiers associated with the customer account. The RUS 102 can undergo a handshaking process with the cloud service provider 122 to establish the secure communication session. During a secure communication session, the RUS 102 may not need to re-authenticate for each transmission.

Using the connection, the RUS 102 can transmit, via the cloud application programming interface, a request for utilization information of the cloud service and threshold information for the cloud service. The RUS 102 can transmit the request based on a time interval (e.g., periodically, every 10 seconds, 30 seconds, 60 seconds, 2 minutes, 5 minutes, 10 minutes, 20 minutes, 30 minutes, 60 minutes, 90 minutes, 2 hours, 3 hours, or other time interval), a condition (e.g., responsive to receiving a certain number of emails, an alert, notification, or trigger) or upon a user request.

The RUS 102 can receive, in response to the request, a utilization value for the cloud service 124. The utilization value can indicate, for example, a bandwidth utilization, a memory utilization, a processor utilization, or input/output utilization. The utilization value can include a numeric value, an absolute value, a relative value, or a percentage. For example, the utilization value can be a percentage of the customer's capacity or allocation for the time period or some other time period that includes the current time period. The utilization value can be a percentage of a historical utilization.

In some cases, the monitoring component 106 can include, access or utilize a remote monitoring and management (RMM) system to implement the measurement of the state information, measurement of resource utilization, update of state information, and update of resource allocation of the cloud service. For example, the RMM system can be designed, constructed or manufactured by LABTECH of Tampa, Fla. may be used for these functions. The RMM system can perform these measurement and control operations by communicating directly with an API for the cloud service 124 itself. The RMM system can perform these measurement and control operations using an API to the hypervisor that is managing the virtual machine where the cloud service is running. The RMM system can perform these measurement and control operations using a local agent that is running on the virtual machine. The local agent can be in communication with the RMM system to receive commands and data from the RMM system, and return status and data to the RMM system. The LABTECH RMM system can install a local agent on the virtual machine running the cloud service 124, and can use the local agent to read the state information of the virtual machine that represents state information of the cloud service, measure the resource usage of the virtual machine that represents the resource usage of the cloud service, update the state information of the virtual machine that controls the state of the cloud service, and update the operating system of the virtual machine to control the resource allocation for the cloud service. For example, the local agent may interact with the WINDOWS registry to measure and control state, and it may interact with the WINDOWS operating system API to measure resource utilization and control resource related allocation. In one embodiment, the local agent can be in communication with the RMM system indirectly through a remote agent that is running on a second machine; the second machine may be a virtual machine that uses the same physical machine as the cloud service, a second physical machine, or a virtual machine on a second physical machine. The RMM can implement the measurement and control operations using a script. In an example embodiment, the RMM system may be running LABTECH scripts.

The RUS 102 can further identify a threshold. The RUS 102 can retrieve the threshold from threshold data structure 116 stored in data repository 114. The RUS 102 can perform a lookup in data repository 114 for the threshold. The RUS 102 can perform the lookup using the customer account identifier, cloud service 124 identifier, or other factors. The RUS 102 can select a threshold from a plurality of thresholds stored in data repository 114. The RUS 102 can select a threshold that is predetermined or assigned for a specific type of resource, time period, customer account or client device 132. The RUS 102 can request the threshold from the cloud service provider 122. The cloud service 122 may determine the threshold based on billing information associated with the customer account of client device 132. The cloud service provider 122 can provide the threshold, such as a dynamic threshold. The cloud service provider 122 can establish the dynamic threshold.

The threshold can be a fixed or static threshold, or a dynamic threshold. For example, the threshold can be dynamic in that the threshold may vary for a customer account based on one or more factors, such as time period, season, day of the week, time of day, month, or geographic region (e.g., users of the cloud service 124 located in different geographic zones or regions can have different thresholds). In some cases, the threshold can vary based on current events, sports, news, or weather. For example, during a major sporting event, political event, or other current event, there may be an increase in a number of server hits or requests for a cloud service 124. The system 102 or cloud service provider 122 may identify that the current event based on an news feed or RSS feed, or based on input from an administrator of the system 102 or cloud service provider 122. The system 102 or cloud service provider 122 may then set a higher threshold to allow the increased utilization.

The RUS 102 can include a validation component 108 designed and constructed to determining that a utilization value of the cloud service during a time interval satisfies (e.g., less than, equal to, or exceeds) the threshold. The validation component 108 can compare the utilization value of the cloud service 124 during the time interval with the threshold to determine that the utilization value is greater than or equal to the threshold. For example, the utilization value for a video streaming cloud service 124 may be 500 Mbps. The threshold for the cloud service 124 for the customer account associated with client device 132 may be 500 Mbps. The RUS 102 can determine that the current utilization value equals the threshold.

In some cases, the RUS 102 can determine that the current utilization value is a certain percentage of the threshold, and determine to disable auto scaling. For example, the threshold may indicate a tier increase or pricing increase for the customer's cloud service plan. To avoid the tier or pricing increase, the RUS 102 can identify when the utilization of the cloud service is approaching the threshold so as not to exceed the threshold or to disable auto scaling prior to exceeding the threshold. In some cases, the RUS 102 can set a threshold that is lower than a threshold that triggers a billing or tier increase. By using a threshold that is lower than the threshold that triggers a billing or tier increase, the RUS 102 can determine that the utilization value equals the threshold and disable auto scaling prior to the tier or billing increase.

The RUS 102 can determine the utilization value as an average utilization value over one or more time periods, mean utilization value over one or more time periods, mode utilization value over one or more time periods, or other statistical value indicative of the utilization value over one or more time periods. The RUS 102 can store or retrieve historical data in the historical data database 118 in data repository 114. The RUS 102 can determine a historical utilization of the cloud service 124 by the client device 132 (e.g., by the customer account associated with the client device 132). The RUS 102 can predict, based on the historical utilization, an estimated utilization value for the time interval. For example, the cloud service 124 may have a high utilization during working hours, such as 9 AM to 5 PM, Monday through Friday, and low utilization outside those hours as compared to during working hours. The cloud service 124 can predict, based on the historical utilization on Monday at 10 AM (or the past 10 Mondays at 10 AM), an estimated utilization value for the time interval (e.g., 10 AM to 11 AM on Monday).

The validation component 108 can apply a policy to determine whether to disable the automatic scaling function of the cloud service. The policy can be retrieved from data repository 114. The policy can include conditional statements, events, thresholds, or triggers. For example, policies can include: if the utilization value is equal to the threshold, disable the auto scaling function; if the utilization value is greater than the threshold, disable the auto scaling function; if the utilization value is less than the threshold, disable the auto scaling function; if the utilization value is equal to or greater than a percentage (e.g., 60%, 70%, 80%, 90%, 95%, 99%) of the threshold, disable the auto scaling function; if the rate of increase of the utilization value over one or more time intervals is at least a percentage (e.g., 20%, 30%, 40%, 50%, 60%, 80%, 90%, 100%, 150% or more), then disable the auto scaling function.

The RUS 102 can determine, based on the policy and a comparison of the utilization value and the threshold, to generate instructions to disable the auto scaling function of the cloud service 124. In some cases, the RUS 102 can determine, based on the policy and a comparison of the estimated utilization value and the utilization value, to generate the instruction to disable the automatic scaling function of the cloud service 124.

The validation component 108 can determine that the one or more servers providing the cloud service are configured to automatically modify a configuration of the cloud service to increase capacity based on the utilization value. The validation component 108 can then determine to disable the auto scaling feature based on the threshold and policy. For example, a packaging component 110 can assemble, responsive to determining to disable the automatic scaling function of the cloud service, a script to disable the automatic scaling function for the cloud service.

The RUS 102 can include a packaging component 110 designed and constructed to generate, compile, obtain, or otherwise provide instructions to the cloud service 124 to disable the auto scaling function. The packaging component 110 can receive an instruction from the validation component 108 to disable the auto scaling function for a particular cloud service 124 for a particular customer account or client device 132. The packaging component 110 can obtain or retrieve one or more instructions or scripts from the instructions data folder 120 stored in data repository 114.

The packaging component 110 can use the results from the validation component 108 to assemble the software components to make configuration changes to the cloud service 124 of the end customer in order to disable the auto scaling function, add a component, service, or configuration, or make another change. The packaging component 110 can assemble scripts, software components, licensing keys, and account information in the instructions package. For example, if an existing component needs to be upgraded to a new version, and the new component is from a new vendor, the packaging function can prepare an instructions package that includes a script to upgrade the existing component, the software with the new version of the existing component, the software for the new component, the license key for the new component, the account information at the new vendor, a script to install the new component, and a script to configure the new component. The packaging component 110 can be controlled by a scripting language, in order to make it easier to add the ability to manage the installation, setup, and configuration of new kinds of components, services, and configurations.

The RUS 102 can include a deployment component 112 designed and constructed to transmit the instructions (or instructions package or package) to the one or more servers of the cloud service provider 122. The RUS 102 can transmit the instructions via a cloud application programming interface 104. In some cases, the RUS 102 can transmit the instructions using the same interface protocol as compared to the interface protocol used to monitor the utilization of the cloud service 124, while in some cases, the RUS 102 can transmit the instructions using a different interface protocol as compared to the interface protocol used to monitor the utilization of the cloud service 124.

The deployment component 112 can apply the package (or instruction package or instructions) to the cloud service 124 in order to actually provide the requested component, service, or configuration (e.g., configuration to disable the auto scaling function). The deployment component 112 can run scripts, download software, apply licenses, access accounts, and sequence operations serially or in parallel as required. These operations can be done using APIs provided by the cloud service software, or by using an agent that is part of the cloud management system running on the cloud platform, or by a combination of the two. The deployment component 112 can be controlled by the scripting language, in order to make it easier to add the ability to perform new kinds of operations. The deployment component 112 can also provide notifications and status updates on its progress to the end customer, the service provider, or both.

The RUS 102 can include a ticket generation component 136 designed and constructed to generate a service ticket data structure with an indication of the utilization value and the time interval. The ticket generation component 136 can provide the service ticket data structure to an electronic board 128 of a customer support system 126 to cause the electronic board 128 to process the service ticket data structure and assign a service ticket 130 to a support agent 202.

The ticket generation component 136 can compile, aggregate or otherwise obtain information that can facilitate generating a ticket. A ticket can refer to a ticket data structure that includes information that can facilitate resolving a technical problem associated with the cloud service 124. For example, the ticket data structure can include a cloud service identifier, a customer account identifier, a utilization value, time stamps associated with the utilization value, a utilization type, a threshold, client device identifier, network logs, or traffic data. The ticket information can include information to facilitate prioritizing and assigning the tickets to support agents, or place the ticket in a ticketing queue.

For example, the support ticket information can indicate a likely customer support situation, and as a result, an API to the customer support system 126 may be used to generate a support ticket indicating that a 90% threshold has been exceeded 3 times in 1 hour, along with information about the tenant (customer associated client device 132) that is affected, the number of connections that were observed, the allocation of connection resources, the times when the connections exceeded the threshold, the overall performance of the physical machine at that time, and so on. If a support ticket for this tenant and condition already exists, it may be preferable to update the existing support ticket with this additional information, rather than creating a new support ticket.

The customer support system 126 can generate notifications based on the support tickets. For example, the customer support system 126 can alert a customer service representative or support agent that the threshold has been exceeded for the number of connections, so that the customer service representative can contact the customer to discuss the situation and decide whether to take corrective action. The customer support system 126 can notify the customer directly to make them aware of the situation. Multiple individuals may be notified, and the notification may use multiple channels, such as text message, email, voice message, social media posting, chat, and so on.

The support tickets and notifications for cloud service issues may be generated in addition to the application of configuration and resource allocation updates for improving the cloud service, reducing the resource utilization, or the application of updates may be contingent on an interaction with the support system. For example, the increase in connection resources may imply an increased cost, and the customer may desire or require sign-off on disabling the auto scaling function, or the system can automatically disable the auto scaling function to block or prevent the increase in the connection resources. The support system can facilitate the automation of the customer sign-off and approval of the application of the update, the RUS 102 can automatically disable the auto scaling function.

Thus, the RUS 102 can communicate with the cloud service provider device 122 to obtain the state information about the cloud service 124. The RUS 102 can use the collected state information prepare a configuration update to be applied to the cloud service 124. The resulting collected state information can also be used by the RUS 102 to interface with a customer support system 126 through a ticket generation component 136. The ticket generation component 136 can communicate directly with the customer support system 126 and in this way, can create a new support ticket 130 or update an existing support ticket 130. The RUS 102 can use the ticket generation component 136 along with the collected state information to create a new ticket 130 or update an existing ticket 130 with information from the collected state information. The ticket 130 may be a result of a configuration update (e.g., disable auto scaling function responsive to a threshold) generated by the RUS 102. The customer support system 126 can also generate a configuration update and use the RUS 102 to apply the configuration update to the cloud service 122. The cloud service 122 can also update the state information directly. This configuration update may reduce the resource utilization of the cloud service 122 as a result. The customer support system 126 can generate a notification based on a new ticket 130 or an existing ticket 130, and the notification can be sent to the client device 132.

The RUS 102 can determine utilization values for one or more time intervals, for one or more cloud services 124, or for one or more customer accounts or tenants. The RUS 102 can determine to disable the auto scaling function in a first time interval, and enable the auto scaling function in a second time interval. The RUS 102 can determine to enable or disable the auto scaling function for a first resource, and disable the auto scaling function for a second resource. Resources can include, for example, processor, number of processors, number of threads per processor, memory, disk storage, I/O ports, or bandwidth.

For example, the RUS 102 can determine that a second utilization value of the cloud service 124 during a second time interval exceeds the threshold. The RUS 102 can determine, however, to enable the automatic scaling function of the cloud service 124 for the second time interval. The RUS 102 can determine to enable the auto scaling function based on the policy. For example, in the second time interval, the rate of increase of the utilization may indicate a desired resource utilization, or the increased utilization may be correlated with a current event, which may indicate a desired increase in resource utilization. Thus, the RUS 102 can determine to enable the auto scaling function in the second time interval.

In some cases, the RUS 102 can analyze the historical utilization to determine to enable the auto scaling function in the second time interval. For example, the RUS 102 can determine that a second utilization value of the cloud service during a second time interval exceeds the threshold. The RUS 102 can determine a historical utilization of the cloud service 124 by the customer account of the client device 132. The RUS 102 (e.g., via the validation component 108) can predict, based on the historical utilization, an estimated utilization value for the second time interval. The RUS 102 can determine, based on the policy and a comparison of the estimated utilization value and the second utilization value, to generate an instruction to enable the automatic scaling function of the cloud service.

The RUS 102 can monitor multiple cloud services 124 provider by one or more cloud service providers 122. For example, the RUS 202 can monitor a second cloud service 124 provided by a second one or more servers of a second cloud service provider 122 different from the first one or more servers of the first cloud service provider 122. The second cloud service 124 can be configured with automatic scaling function based on a second threshold. The RUS 102 can determine, based on the second threshold and a second utilization value of the second cloud service during a second time interval, to disable the automatic scaling function of the second cloud service. The RUS 102 can transmit an instruction to the second one or more servers via a third cloud application programming interface 104 to disable the automatic scaling function of the second cloud service 124. Thus, the RUS 102 can interface and interact with multiple cloud services 124 provided by multiple cloud service providers 122 that can be different from another, thereby providing a central resource utilization system 102 for the customer of client device 132.

Figure 2:
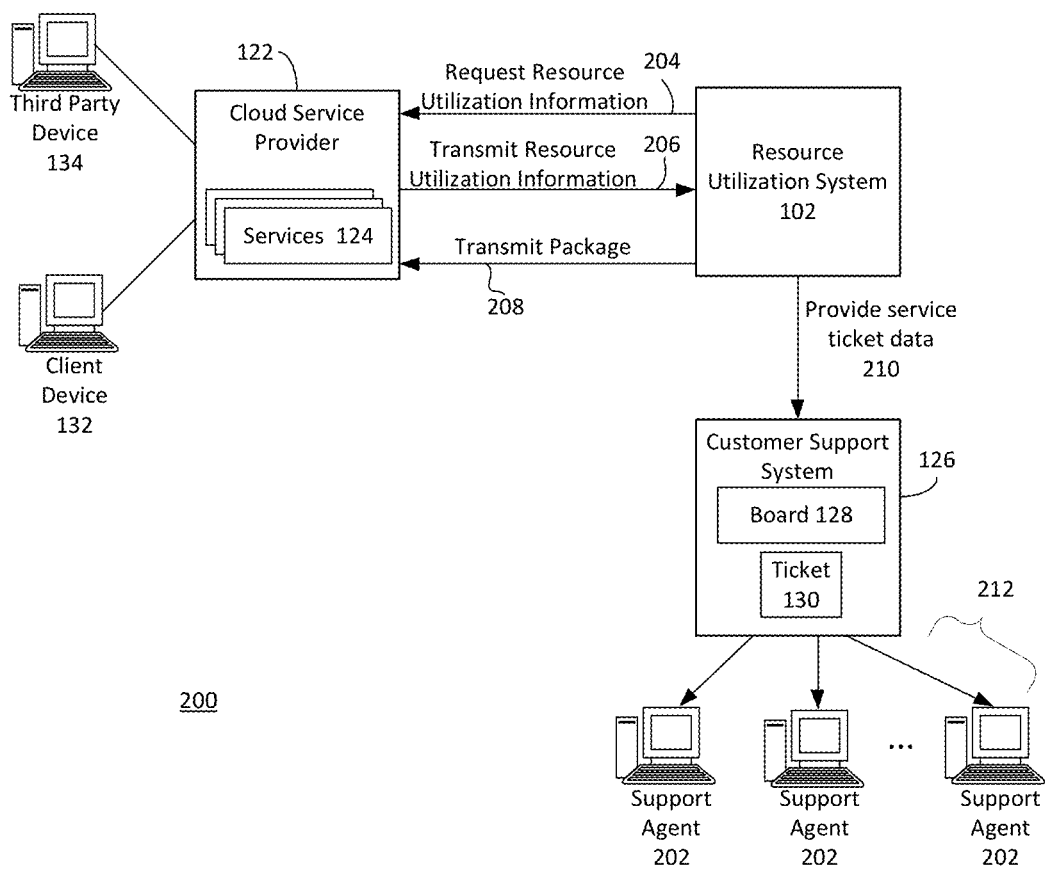
FIG. 2 is an illustrative block diagram of an example embodiment of a system in operation to manage resource utilization in cloud service infrastructure.

Referring now to FIG. 2, an illustrative block diagram of an example embodiment of a system 200 in operation to manage resource utilization in cloud service infrastructure is shown. The system 200 can include one or more component or function of system 100, system 400 or the system or components depicted in FIGS. 6A-6D. The third party device 134 and client device 132 can access or interact with services 124 provided by the cloud service provider 122. While one or more third party devices 134 or client devices 132 interact with the one or more cloud services 124, the resource utilization system 102 can request resource utilization information at act 204. At act 206, the cloud service provider 122 can transmit resource utilization information to the RUS 102. The RUS 102 can receive the utilization information. The RUS 102 can process the received resource utilization information. At act 208, the RUS 102 can transmit a package, such as an instruction package, with configuration update information to, for example, disable an auto scaling function.

Figure 3:
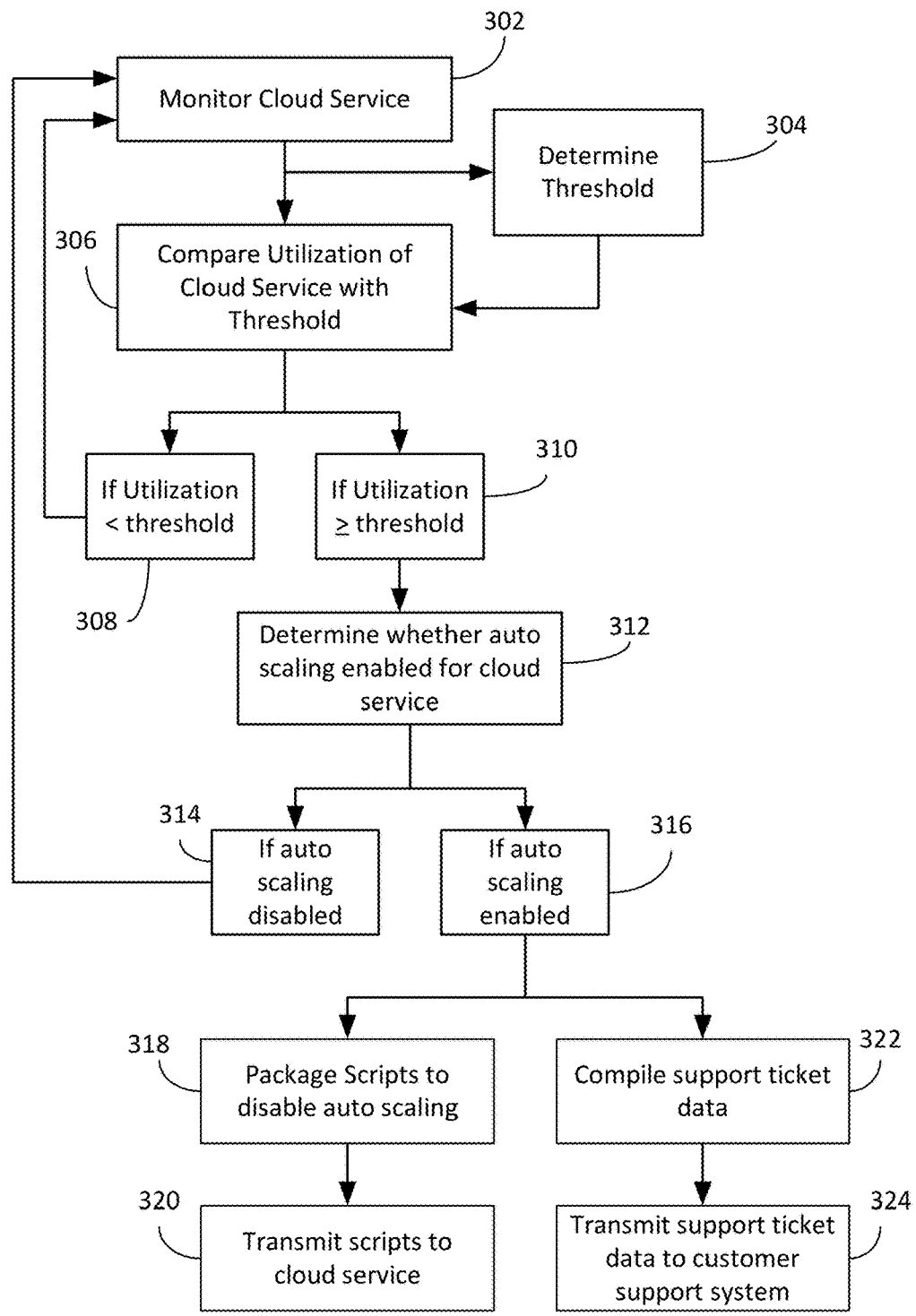
FIG. 3 is an illustrative flow chart of a system operating to manage resource utilization in cloud service infrastructure, in accordance with an embodiment.

Referring now to FIG. 3, an illustrative flow chart of an embodiment of a system operating to manage resource utilization in cloud service infrastructure is shown. The flow chart can be performed by one or more component, element or system depicted in FIGS. 1, 2, 4 and 6A-6D. For example, the flow 300 can be performed by a resource utilization system. At 302, the system can monitor cloud services to determine one or more utilization values for one or more resources used by the one or more cloud services. At 304, the system can determine a threshold for the utilization of a resource. At 306, the system can compare the utilization value of the cloud service with the threshold. If the utilization is less than the threshold (or otherwise does not satisfy the threshold) at 308, the system can return to block 302 and continue to monitor the utilization of the cloud services.

If the utilization satisfies the threshold (e.g., greater than or equal to the threshold) at block 310, the system can proceed to block 312 to determine whether an auto scaling function for the resource corresponding to the utilization value is enabled. The system can make this determination by transmitting request for information via an API to the cloud service provider device, or parsing a configuration file with this information. If the system determines that auto scaling is disabled at block 314, the system can return to monitoring cloud services at block 302. If, at block 316, the system determines that auto scaling is enabled for the cloud service and for the resource corresponding to the utilization value that exceeds the threshold, ad determined at block 310, the system can proceed to block 318 to package scripts to disable the auto scaling function in order to reduce resource utilization. The system can then transmit the package scripts at block 320 to the cloud service platform. Further, the system can proceed, in serial or parallel, to block 322 and compile support ticket data to facilitate the generation of a support ticket. The system can proceed to block 324 and transmit the support ticket data to a customer support system.

Figure 4:
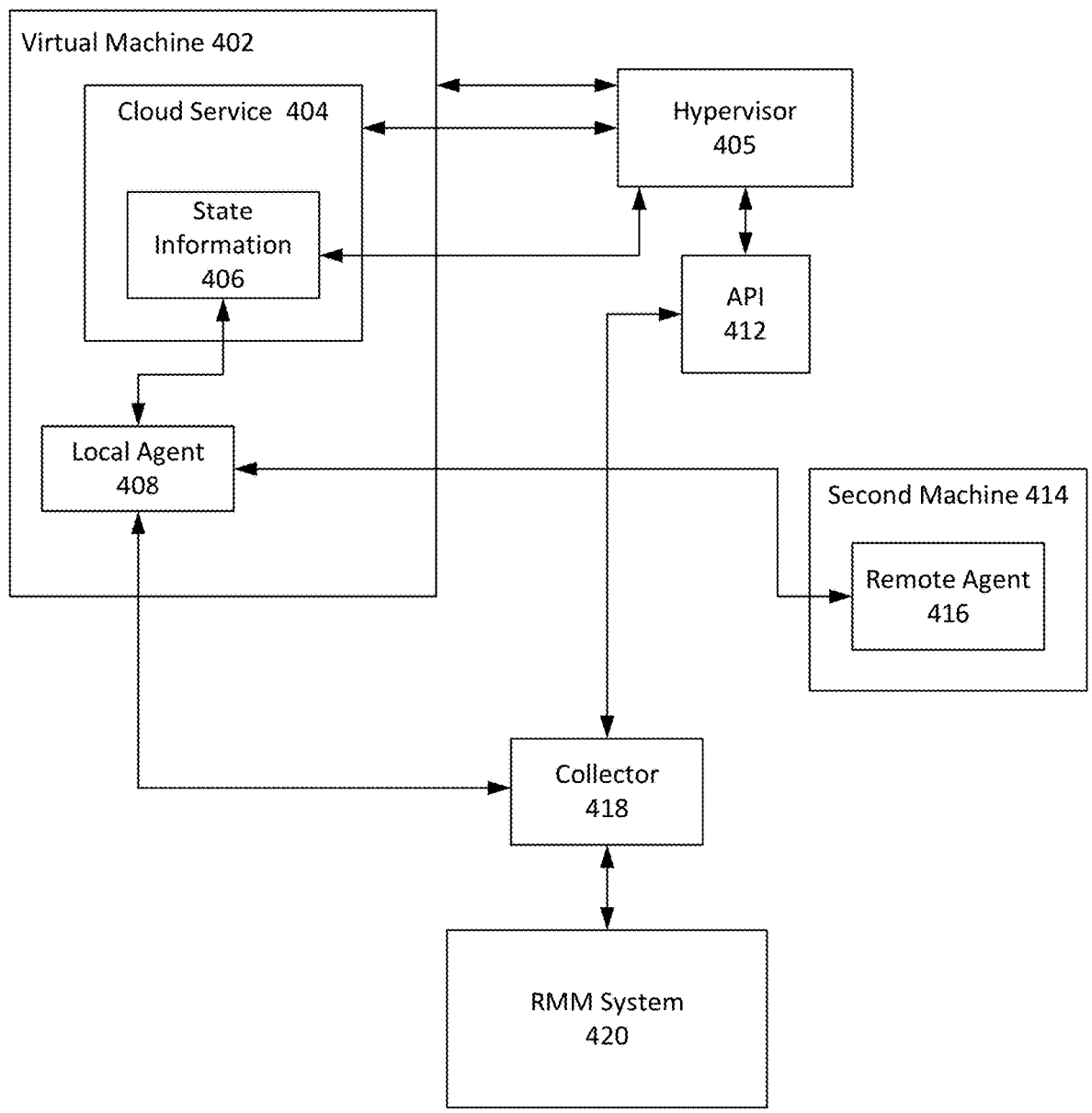
FIG. 4 is an illustrative block diagram of an example embodiment of a system for collecting state information and resource utilization of a cloud service using a remote monitoring and management (RMM) system.

FIG. 4 is an illustrative block diagram of an example embodiment of a system for collecting state information and resource utilization of a cloud service using a remote monitoring and management (RMM) system. The system 400 can include one or more component, system or functionality depicted in FIGS. 1-3 and 6A-6D. A cloud service 404 (e.g., cloud service 124 of FIG. 1) running on a virtual machine 402 may allow even more fine grained control over the measurement and update of state information 406 for the cloud service 404, which can include control information for the cloud service 404. The hypervisor 405 of the virtual machine 402 may have direct access to the memory and storage of the cloud service 404 or the state information 406 itself, and may have access to the operating system of the virtual machine 402 that controls many of the operational aspects of the cloud service 404. A collector 418 that is monitoring the cloud service 404 can then have access to the hypervisor 405 through an API 412. Additionally, a remote monitoring and management (RMM) system 420 may install a local agent 408 on the virtual machine. The local agent 408 can run as a separate process on the virtual machine 402 and may have access to the cloud service 404, the state information 406, and the operating system of the virtual machine 402, in much the same way as the hypervisor 405. However, since the local agent 408 is running as a process inside the virtual machine 402, it may have some capabilities that are more complete or more convenient than those of the hypervisor 405. Accordingly, the collector 418 may be able to retrieve additional useful information about the cloud service 404, or even control the cloud service 404, through the local agent 408 under the direction of the RMM system 420. It may be that direct access to the local agent 408 is difficult or impossible, for example, due to security concerns, but it may be reasonable to access the local agent 408 from another instance of the agent that acts as a remote agent 416 running on a second machine 414. In this case, the collector may be able to retrieve additional useful information about the cloud service 404, or even control the cloud service 404, through the remote agent 416 running on the second machine 414, under the direction of the RMI system 420.

Figure 5:
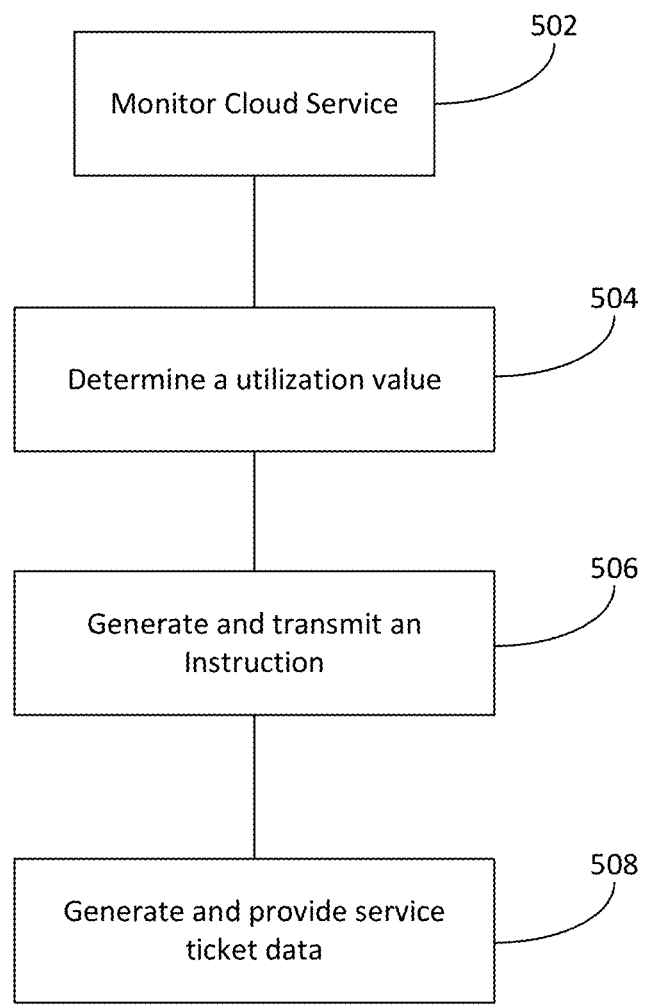
FIG. 5 is an illustrative block diagram of an example embodiment of a method of managing resource utilization in cloud service infrastructure.

Referring to FIG. 5, an illustrative block diagram of an example embodiment of a method 500 of managing resource utilization in cloud service infrastructure is shown. The method 500 can be performed by one or more system or component depicted in FIGS. 1, 2, 4 and 6A-6D. For example, method 500 can be performed by a device intermediary to a cloud service provider and a customer's client device, such as a resource utilization system. In brief overview, the method 500 includes monitoring cloud services at 502. At 504, the method 500 includes determining a utilization value for a resource used by the cloud service. At 506, the method 500 includes generating and transmitting an instruction. At 508, the method 500 includes generating and providing service ticket data.

Still referring to FIG. 5, and in further detail, the method 500 includes monitoring cloud services at 502. For example, a device intermediary to a client device and one or more servers that provide cloud services can monitor the utilization of cloud services. The device can monitor the cloud service using a cloud application programming interface. The cloud service can be provided by the one or more servers of a cloud service provider. The cloud service configured with an automatic scaling function based on a threshold. For example, the cloud service provider may automatically increase a resource allocation based on a utilization of the resource exceeding or approaching a threshold.

At 504, the device can determine a utilization value for a resource used by the cloud service. The device can determine the utilization value based on the monitoring. The device can determine that the utilization value of the cloud service exceeds the threshold during a time interval.

At 506, the method 500 includes generating and transmitting an instruction. The instruction can include an instruction package to update, change, modify or otherwise change the cloud service. The device can determine to generate the instruction based on a policy, the utilization value, and the threshold. For example, the policy may be to disable the auto scaling function if the current utilization value exceeds the threshold. The device can transmit the instruction to the one or more servers via a cloud application programming interface.

At 508, the method 500 includes generating and providing service ticket data. The device can determine to generate and provide the service ticket data responsive to the policy (e.g., the policy may indicate to provide service ticket responsive to determining to disable a function or feature of the cloud service). The device can generate a service ticket data structure with an indication of the utilization value and the time interval, and provide the service ticket data structure to an electronic board to cause the electronic board to process the service ticket data structure and assign a service ticket to a support agent.

Referring to FIG. 6A, an embodiment of a network environment that can be used in connection with the methods and systems described herein is depicted. In brief overview, the network environment includes one or more clients 602a-602n (also generally referred to as local machine(s) 602, client(s) 602, client node(s) 602, client machine(s) 602, client computer(s) 602, client device(s) 602, endpoint(s) 602, or endpoint node(s) 602) in communication with one or more servers 606a-606n (also generally referred to as server(s) 606, node 606, or remote machine(s) 606) via one or more networks 604. In some embodiments, a client 602 has the capacity to function as both a client node seeking access to resources provided by a server and as a server providing access to hosted resources for other clients 602a-602n.

Although FIG. 6A shows a network 604 between the clients 602 and the servers 606, the clients 602 and the servers 606 may be on the same network 604. In some embodiments, there are multiple networks 604 between the clients 602 and the servers 606. In one of these embodiments, a network 604' (not shown) may be a private network and a network 604 may be a public network. In another of these embodiments, a network 604 may be a private network and a network 604' a public network. In still another of these embodiments, networks 604 and 604' may both be private networks.

The network 604 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular xnetwork standards may use various channel access methods e.g. FDMA, TDMA, CDMA, or SDMA. In some embodiments, different types of data may be transmitted via different links and standards. In other embodiments, the same types of data may be transmitted via different links and standards.

The network 604 may be any type and/or form of network. The geographical scope of the network 604 may vary widely and the network 604 can be a body area network (BAN), a personal area network (PAN), a local-area network (LAN), e.g. Intranet, a metropolitan area network (MAN), a wide area network (WAN), or the Internet. The topology of the network 604 may be of any form and may include, e.g., any of the following: point-to-point, bus, star, ring, mesh, or tree. The network 604 may be an overlay network which is virtual and sits on top of one or more layers of other networks 604'. The network 604 may be of any such network topology as known to those ordinarily skilled in the art capable of supporting the operations described herein. The network 604 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 604 may be a type of a broadcast network, a telecommunications network, a data communication network, or a computer network.

In some embodiments, the system may include multiple, logically-grouped servers 606. In one of these embodiments, the logical group of servers may be referred to as a server farm 38 or a machine farm 38. In another of these embodiments, the servers 606 may be geographically dispersed. In other embodiments, a machine farm 38 may be administered as a single entity. In still other embodiments, the machine farm 38 includes a plurality of machine farms 38. The servers 606 within each machine farm 38 can be heterogeneous—one or more of the servers 606 or machines 606 can operate according to one type of operating system platform (e.g., WINDOWS NT, manufactured by Microsoft Corp. of Redmond, Wash.), while one or more of the other servers 606 can operate on according to another type of operating system platform (e.g., Unix, Linux, or Mac OS X).

In one embodiment, servers 606 in the machine farm 38 may be stored in high-density rack systems, along with associated storage systems, and located in an enterprise data center. In this embodiment, consolidating the servers 606 in this way may improve system manageability, data security, the physical security of the system, and system performance by locating servers 606 and high performance storage systems on localized high performance networks. Centralizing the servers 606 and storage systems and coupling them with advanced system management tools allows more efficient use of server resources.

The servers 606 of each machine farm 38 do not need to be physically proximate to another server 606 in the same machine farm 38. Thus, the group of servers 606 logically grouped as a machine farm 38 may be interconnected using a wide-area network (WAN) connection or a metropolitan-area network (MAN) connection. For example, a machine farm 38 may include servers 606 physically located in different continents or different regions of a continent, country, state, city, campus, or room. Data transmission speeds between servers 606 in the machine farm 38 can be increased if the servers 606 are connected using a local-area network (LAN) connection or some form of direct connection. Additionally, a heterogeneous machine farm 38 may include one or more servers 606 operating according to a type of operating system, while one or more other servers 606 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 606 may comprise components, subsystems and modules to support one or more management services for the machine farm 38. In one of these embodiments, one or more servers 606 provide functionality for management of dynamic data, including techniques for handling failover, data replication, and increasing the robustness of the machine farm 38. Each server 606 may communicate with a persistent store and, in some embodiments, with a dynamic store.

Server 606 may be a file server, application server, web server, proxy server, appliance, network appliance, gateway, gateway server, virtualization server, deployment server, SSL VPN server, or firewall. In one embodiment, the server 606 may be referred to as a remote machine or a node. In another embodiment, a plurality of nodes 290 may be in the path between any two communicating servers.

Figure 6B:
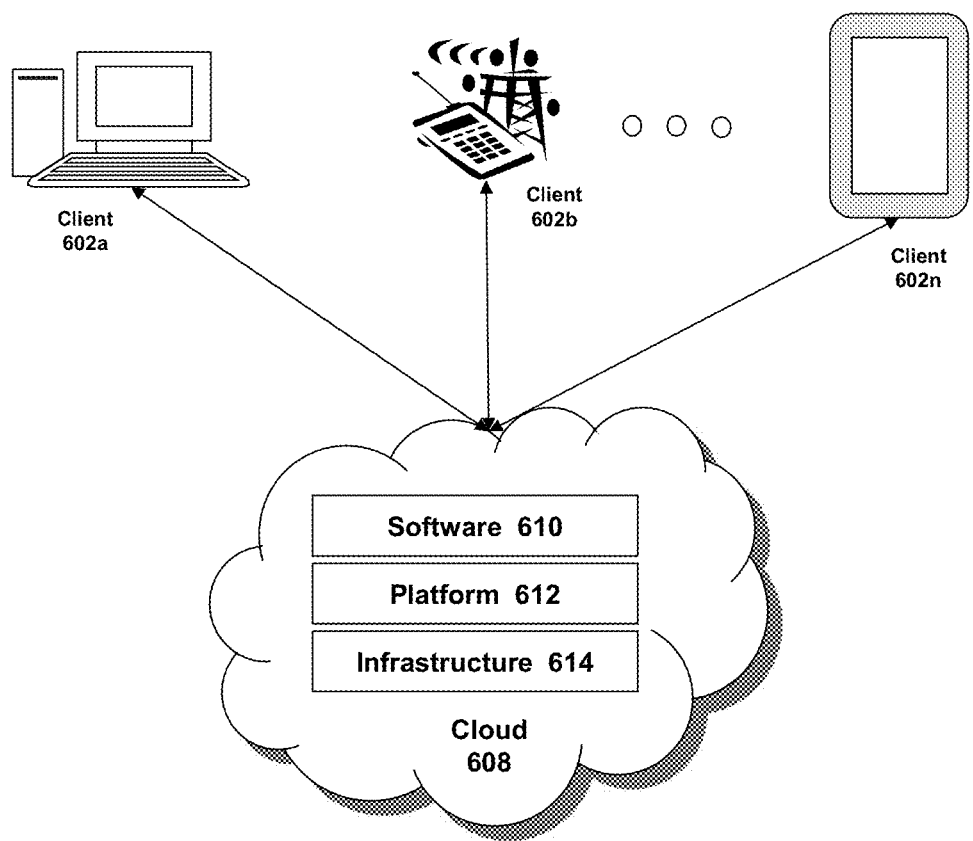
FIG. 6B is a block diagram depicting a cloud computing environment comprising client device in communication with cloud service providers.

Referring to FIG. 6B, a cloud computing environment is depicted. A cloud computing environment may provide client 602 with one or more resources provided by a network environment. The cloud computing environment may include one or more clients 602a-602n, in communication with the cloud 608 over one or more networks 604. Clients 602 may include, e.g., thick clients, thin clients, and zero clients. A thick client may provide at least some functionality even when disconnected from the cloud 608 or servers 606. A thin client or a zero client may depend on the connection to the cloud 608 or server 606 to provide functionality. A zero client may depend on the cloud 608 or other networks 604 or servers 606 to retrieve operating system data for the client device. The cloud 608 may include back end platforms, e.g., servers 606, storage, server farms or data centers.

The cloud 608 may be public, private, or hybrid. Public clouds may include public servers 606 that are maintained by third parties to the clients 602 or the owners of the clients. The servers 606 may be located off-site in remote geographical locations as disclosed above or otherwise. Public clouds may be connected to the servers 606 over a public network. Private clouds may include private servers 606 that are physically maintained by clients 602 or owners of clients. Private clouds may be connected to the servers 606 over a private network 604. Hybrid clouds 608 may include both the private and public networks 604 and servers 606.

The cloud 608 may also include a cloud based delivery, e.g. Software as a Service (SaaS) 610, Platform as a Service (PaaS) 612, and Infrastructure as a Service (IaaS) 614. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 602 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 602 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 602 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 602 may also access SaaS resources through smartphone or tablet applications, including, e.g., Salesforce Sales Cloud, or Google Drive app. Clients 602 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 6C:
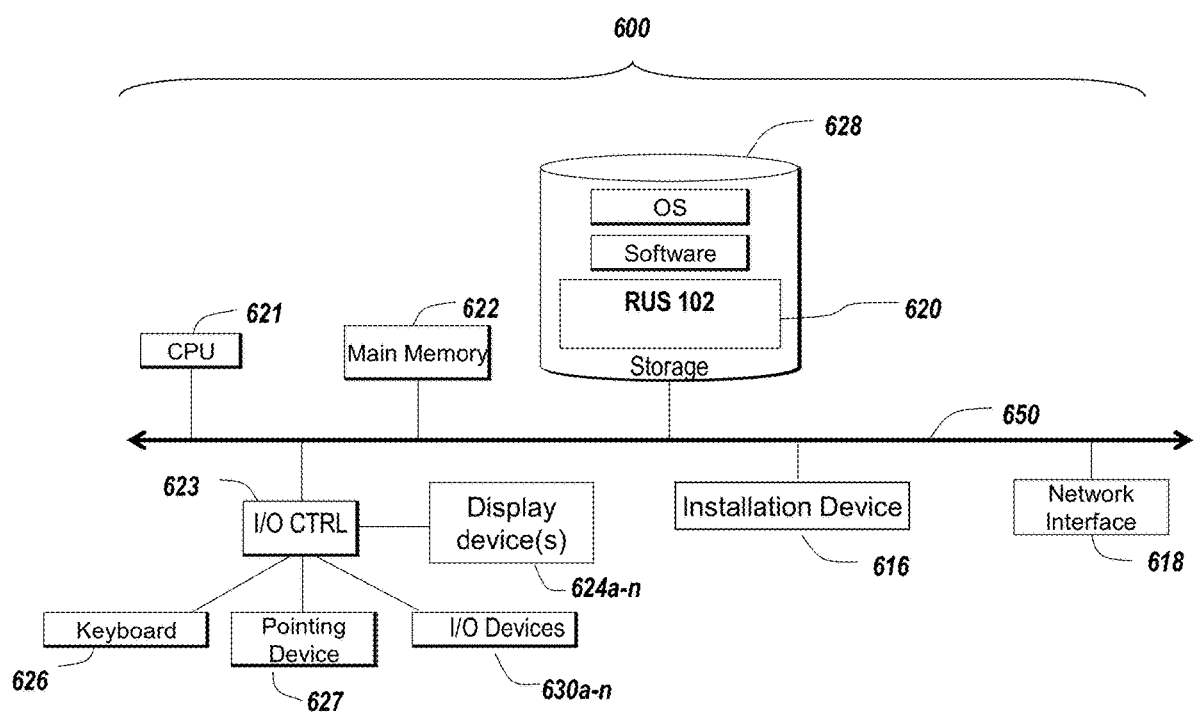
FIGS. 6C and 6D are block diagrams depicting embodiments of computing devices useful in connection with the methods and systems described herein.
Figure 6D:
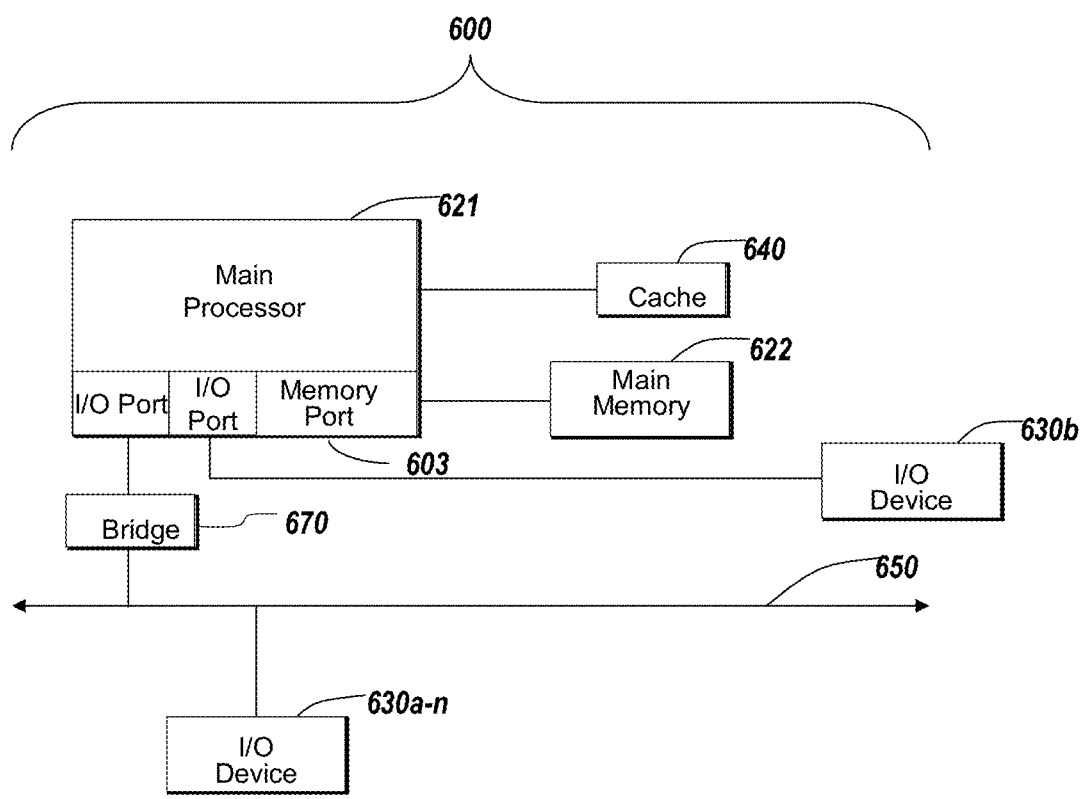

The client 602 and server 606 may be deployed as and/or executed on any type and form of computing device, e.g. a computer, network device or appliance capable of communicating on any type and form of network and performing the operations described herein. FIGS. 6C and 6D depict block diagrams of a computing device 600 useful for practicing an embodiment of the client 602 or a server 606. As shown in FIGS. 6C and 6D, each computing device 600 includes a central processing unit 621, and a main memory unit 622. As shown in FIG. 6C, a computing device 600 may include a storage device 628, an installation device 616, a network interface 618, an I/O controller 623, display devices 624a-624n, a keyboard 626 and a pointing device 627, e.g. a mouse. The storage device 628 may include, without limitation, an operating system, software, and a software of or associated with SCS 100. As shown in FIG. 6D, each computing device 600 may also include additional optional elements, e.g. a memory port 603, a bridge 670, one or more input/output devices 630a-630n (generally referred to using reference numeral 630), and a cache memory 640 in communication with the central processing unit 621.

The central processing unit 621 is any logic circuitry that responds to and processes instructions fetched from the main memory unit 622. In many embodiments, the central processing unit 621 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 600 may be based on any of these processors, or any other processor capable of operating as described herein. The central processing unit 621 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 622 may include one or more memory chips capable of storing data and allowing any storage location to be directly accessed by the microprocessor 621. Main memory unit 622 may be volatile and faster than storage 628 memory. Main memory units 622 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 622 or the storage 628 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAIVI), Silicon-Oxide-Nitride-Oxide-Silicon (SO-NOS), Resistive RAM (RRAIVI), Racetrack, Nano-RAM (NRAM), or Millipede memory. The main memory 622 may be based on any of the above described memory chips, or any other available memory chips capable of operating as described herein. In the embodiment shown in FIG. 6C, the processor 621 communicates with main memory 622 via a system bus 650 (described in more detail below). FIG. 6D depicts an embodiment of a computing device 600 in which the processor communicates directly with main memory 622 via a memory port 603. For example, in FIG. 6D the main memory 622 may be DRDRAM.

FIG. 6D depicts an embodiment in which the main processor 621 communicates directly with cache memory 640 via a secondary bus, sometimes referred to as a backside bus. In other embodiments, the main processor 621 communicates with cache memory 640 using the system bus 650. Cache memory 640 typically has a faster response time than main memory 622 and is typically provided by SRAM, BSRAM, or EDRAM. In the embodiment shown in FIG. 6D, the processor 621 communicates with various I/O devices 630 via a local system bus 650. Various buses may be used to connect the central processing unit 621 to any of the I/O devices 630, including a PCI bus, a PCI-X bus, or a PCI-Express bus, or a NuBus. For embodiments in which the I/O device is a video display 624, the processor 621 may use an Advanced Graphics Port (AGP) to communicate with the display 624 or the I/O controller 623 for the display 624. FIG. 6D depicts an embodiment of a computer 600 in which the main processor 621 communicates directly with I/O device 630*b* or other processors 621' via HYPERTRANSPORT, RAPIDIO, or INFINIBAND communications technology. FIG. 6D also depicts an embodiment in which local busses and direct communication are mixed: the processor 621 communicates with I/O device 630*a* using a local interconnect bus while communicating with I/O device 630*b* directly.

A wide variety of I/O devices 630*a*-630*n* may be present in the computing device 600. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 630*a*-630*n* may include a combination of multiple input or output devices, including, e.g., Microsoft KINECT, Nintendo Wiimote for the WII, Nintendo WII U GAMEPAD, or Apple IPHONE. Some devices 630*a*-630*n* allow gesture recognition inputs through combining some of the inputs and outputs. Some devices 630*a*-630*n* provides for facial recognition which may be utilized as an input for different purposes including authentication and other commands. Some devices 630*a*-630*n* provides for voice recognition and inputs, including, e.g., Microsoft KINECT, SIRI for IPHONE by Apple, Google Now or Google Voice Search.

Additional devices 630*a*-630*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 630*a*-630*n*, display devices 624*a*-624*n* or group of devices may be augment reality devices. The I/O devices may be controlled by an I/O controller 623 as shown in FIG. 6C. The I/O controller may control one or more I/O devices, such as, e.g., a keyboard 626 and a pointing device 627, e.g., a mouse or optical pen. Furthermore, an I/O device may also provide storage and/or an installation medium 616 for the computing device 600. In still other embodiments, the computing device 600 may provide USB connections (not shown) to receive handheld USB storage devices. In further embodiments, an I/O device 630 may be a bridge between the system bus 650 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 624*a*-624*n* may be connected to I/O controller 623. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 624*a*-624*n* may also be a head-mounted display (HMD). In some embodiments, display devices 624*a*-624*n* or the corresponding I/O controllers 623 may be controlled through or have hardware support for OPENGL or DIRECTX API or other graphics libraries.

In some embodiments, the computing device 600 may include or connect to multiple display devices 624*a*-624*n*, which each may be of the same or different type and/or form. As such, any of the I/O devices 630*a*-630*n* and/or the I/O controller 623 may include any type and/or form of suitable hardware, software, or combination of hardware and software to support, enable or provide for the connection and use of multiple display devices 624*a*-624*n* by the computing device 600. For example, the computing device 600 may include any type and/or form of video adapter, video card, driver, and/or library to interface, communicate, connect or otherwise use the display devices 624*a*-624*n*. In one embodiment, a video adapter may include multiple connectors to interface to multiple display devices 624*a*-624*n*. In other embodiments, the computing device 600 may include multiple video adapters, with each video adapter connected to one or more of the display devices 624*a*-624*n*. In some embodiments, any portion of the operating system of the computing device 600 may be configured for using multiple displays 624*a*-624*n*. In other embodiments, one or more of the display devices 624*a*-624*n* may be provided by one or more other computing devices 600*a* or 600*b* connected to the computing device 600, via the network 604. In some embodiments software may be designed and constructed to use another computer's display device as a second display device 624*a* for the computing device 600. For example, in one embodiment, an Apple iPad may connect to a computing device 600 and use the display of the device 600 as an additional display screen that may be used as an extended desktop. One ordinarily skilled in the art will recognize and appreciate the various ways and embodiments that a computing device 600 may be configured to have multiple display devices 624*a*-624*n*.

Referring again to FIG. 6C, the computing device 600 may comprise a storage device 628 (e.g. one or more hard disk drives or redundant arrays of independent disks) for storing an operating system or other related software, and for storing application software programs such as any program related to the software 620 for the experiment tracker system. Examples of storage device 628 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 628 may be non-volatile, mutable, or read-only. Some storage device 628 may be internal and connect to the computing device 600 via a bus 650. Some storage device 628 may be external and connect to the computing device 600 via a I/O device 630 that provides an external bus. Some storage device 628 may connect to the computing device 600 via the network interface 618 over a network 604, including, e.g., the Remote Disk for MACBOOK AIR by Apple. Some client devices 600 may not require a non-volatile storage device 628 and may be thin clients or zero clients 602. Some storage device 628 may also be used as a installation device 616, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 600 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 602. An application distribution platform may include a repository of applications on a server 606 or a cloud 608, which the clients 602a-602n may access over a network 604. An application distribution platform may include application developed and provided by various developers. A user of a client device 602 may select, purchase and/or download an application via the application distribution platform.

Furthermore, the computing device 600 may include a network interface 618 to interface to the network 604 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 600 communicates with other computing devices 600' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 618 may comprise a built-in network adapter, network interface card, PCMCIA network card, EXPRESSCARD network card, card bus network adapter, wireless network adapter, USB network adapter, modem or any other device suitable for interfacing the computing device 600 to any type of network capable of communication and performing the operations described herein.

A computing device 600 of the sort depicted in FIGS. 6B and 6C may operate under the control of an operating system, which controls scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 600 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 600 has sufficient processor power and memory capacity to perform the operations described herein. In some embodiments, the computing device 600 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 600 is a gaming system. For example, the computer system 600 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 600 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 600 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 600 is a tablet e.g. the IPAD line of devices by Apple; GALAXY TAB family of devices by Samsung; or KINDLE FIRE, by Amazon.com, Inc. of Seattle, Wash. In other embodiments, the computing device 600 is a eBook reader, e.g. the KINDLE family of devices by Amazon.com, or NOOK family of devices by Barnes & Noble, Inc. of New York City, N.Y.

In some embodiments, the communications device 602 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 602 is a laptop or desktop computer equipped with a web browser and a microphone and speaker system, e.g. a telephony headset. In these embodiments, the communications devices 602 are web-enabled and can receive and initiate phone calls. In some embodiments, a laptop or desktop computer is also equipped with a webcam or other video capture device that enables video chat and video call.

In some embodiments, the status of one or more machines 602, 606 in the network 604 can be monitored as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. The computer-readable programs can be implemented in a programming language, such as LISP, PERL, C, C++, C #, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures may be performed in any order. In certain embodiments, multitasking and parallel processing may be advantageous.

While this specification contains many specific implementation details, these should not be construed as limitations on the scope of any subject matter of what may be claimed, but rather as descriptions of features specific to particular implementations of the subject matter. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of managing resource utilization in cloud service infrastructure, comprising:

monitoring, by a device intermediary to a client device and one or more servers that provide cloud services, via a first cloud application programming interface, a cloud service provided by the one or more servers, the cloud service configured with an automatic scaling function based on a threshold;

determining, by the device based on the monitoring, that a utilization value of the cloud service during a time interval exceeds the threshold;

generating, by the device using a policy based on the utilization value and the threshold, an instruction to disable the automatic scaling function of the cloud service by the one or more servers;

transmitting, by the device, the instruction to the one or more servers via a second cloud application programming interface;

generating, by the device responsive to the policy, a service ticket data structure with an indication of the utilization value and the time interval; and providing, by the device, the service ticket data structure to an electronic board to cause the electronic board to process the service ticket data structure and assign a service ticket to a support agent.

2. The method of claim 1, comprising:

transmitting, by the device via the first cloud application programming interface, a request for utilization information of the cloud service and threshold information for the cloud service; and receiving, by the device responsive to the request, the utilization value and the threshold.

3. The method of claim 1, wherein the utilization value corresponds to at least one of a bandwidth utilization, a memory utilization, a processor utilization, storage utilization, or input/output utilization.

4. The method of claim 1, wherein the threshold comprises a dynamic threshold established by a provider of the cloud service.

5. The method of claim 1, comprising:

determining a historical utilization of the cloud service by the client device;

predicting, based on the historical utilization, an estimated utilization value for the time interval; and determining, based on the policy and a comparison of the estimated utilization value and the utilization value, to generate the instruction to disable the automatic scaling function of the cloud service.

6. The method of claim 1, comprising:

determining, by a validation component of the device, that the one or more servers providing the cloud service are configured to automatically modify a configuration of the cloud service to increase capacity based on the utilization value; and assembling, by a packaging component of the device responsive to determining to disable the automatic scaling function of the cloud service, a script to disable the automatic scaling function for the cloud service.

7. The method of claim 1, comprising:

determining, by the device, that a second utilization value of the cloud service during a second time interval exceeds the threshold; and generating, based on the policy, an instruction to enable the automatic scaling function of the cloud service for the second time interval.

8. The method of claim 1, comprising:

determining, by the device, that a second utilization value of the cloud service during a second time interval exceeds the threshold;

determining a historical utilization of the cloud service by the client device;

predicting, based on the historical utilization, an estimated utilization value for the second time interval; and determining, based on the policy and a comparison of the estimated utilization value and the second utilization value, to generate an instruction to enable the automatic scaling function of the cloud service.

9. The method of claim 1, comprising:

monitoring, by the device, a second cloud service provided by a second one or more servers different from the one or more servers, the second cloud service configured with automatic scaling function based on a second threshold;

determining, by the device based on the second threshold and a second utilization value of the second cloud service during a second time interval, to disable the automatic scaling function of the second cloud service; and transmitting, by the device, an instruction to the second one or more servers via a third cloud application programming interface to disable the automatic scaling function of the second cloud service.

10. The method of claim 9, wherein the cloud service is provided by a first cloud service provider, and the second cloud service is provided by a second cloud service provider different from the first cloud service provider.

11. A system to manage resource utilization in cloud service infrastructure, comprising:

a device comprising one or more hardware processors, the device intermediary to a client device and one or more servers that provide cloud services, wherein the device is configured to:

monitor, via a first cloud application programming interface of the device, a cloud service provided by the one or more servers, the cloud service configured with an automatic scaling function based on a threshold;

determine, based on the monitor, that a utilization value of the cloud service during a time interval exceeds the threshold;

generate, using a policy based on the utilization value and the threshold, an instruction to disable the automatic scaling function of the cloud service by the one or more servers;

transmit the instruction to the one or more servers via a second cloud application programming interface;

generate, responsive to the policy, a service ticket data structure with an indication of the utilization value and the time interval; and provide the service ticket data structure to an electronic board to cause the electronic board to process the service ticket data structure and assign a service ticket to a support agent.

12. The system of claim 11, wherein the device is configured to:

transmit, via the first cloud application programming interface, a request for utilization information of the cloud service and threshold information for the cloud service; and receiving, by the device responsive to the request, the utilization value and the threshold.

13. The system of claim 11, wherein the utilization value corresponds to at least one of a bandwidth utilization, a memory utilization, a processor utilization, or input/output utilization.

14. The system of claim 11, wherein the threshold comprises a dynamic threshold established by a provider of the cloud service.

15. The system of claim 11, wherein the device is configured to:
   determine a historical utilization of the cloud service by the client device;
   predict, based on the historical utilization, an estimated utilization value for the time interval; and
   determine, based on the policy and a comparison of the estimated utilization value and the utilization value, to generate the instruction to disable the automatic scaling function of the cloud service.

16. The system of claim 11, wherein the device is configured to:
   determine that the one or more servers providing the cloud service are configured to automatically modify a configuration of the cloud service to increase capacity based on the utilization value; and
   assemble, responsive to determining to disable the automatic scaling function of the cloud service, a script to disable the automatic scaling function for the cloud service.

17. The system of claim 11, wherein the device is configured to:
   determine that a second utilization value of the cloud service during a second time interval exceeds the threshold; and
   generating, based on the policy, to enable the automatic scaling function of the cloud service for the second time interval.

18. The system of claim 11, wherein the device is configured to:
   determine that a second utilization value of the cloud service during a second time interval exceeds the threshold;
   determine a historical utilization of the cloud service by the client device;
   predict, based on the historical utilization, an estimated utilization value for the second time interval; and
   determine, based on the policy and a comparison of the estimated utilization value and the second utilization value, to generate an instruction to enable the automatic scaling function of the cloud service.

19. The system of claim 11, wherein the device is configured to:
   monitor a second cloud service provided by a second one or more servers different from the one or more servers, the second cloud service configured with automatic scaling function based on a second threshold;
   determine, based on the second threshold and a second utilization value of the second cloud service during a second time interval, to disable the automatic scaling function of the second cloud service; and
   transmit an instruction to the second one or more servers via a third cloud application programming interface to disable the automatic scaling function of the second cloud service.

20. The system of claim 19, wherein the cloud service is provided by a first cloud service provider, and the second cloud service is provided by a second cloud service provider different from the first cloud service provider.

* * * * *